US012625228B2

(12) United States Patent
Vollbracht et al.

(10) Patent No.: US 12,625,228 B2
(45) Date of Patent: May 12, 2026

(54) RADAR SYSTEM FOR AUTOMOTIVE APPLICATIONS

(71) Applicant: Aptiv Technologies AG, Schaffhausen (CH)

(72) Inventors: Dennis Vollbracht, Hilden (DE); Sadam Hussain Kazimi, Wuppertal (DE); Sachit Varma, Ratingen (DE)

(73) Assignee: APTIV TECHNOLOGIES AG, Schaffhausen (CH)

( * ) Notice: Subject to any disclaimer, the term of this patent is extended or adjusted under 35 U.S.C. 154(b) by 346 days.

(21) Appl. No.: 18/345,920

(22) Filed: Jun. 30, 2023

(65) Prior Publication Data

US 2024/0012097 A1 Jan. 11, 2024

(30) Foreign Application Priority Data

Jul. 5, 2022 (EP) .................................... 22183083

(51) Int. Cl.
| | |
|---|---|
| *G01S 7/02* | (2006.01) |
| *G01S 7/03* | (2006.01) |
| *G01S 13/931* | (2020.01) |

(52) U.S. Cl.
CPC ................ *G01S 7/024* (2013.01); *G01S 7/03* (2013.01); *G01S 13/931* (2013.01)

(58) Field of Classification Search
CPC ........ G01S 13/42; G01S 13/87; G01S 13/931; G01S 2013/9322; G01S 7/024;
(Continued)

(56) References Cited

U.S. PATENT DOCUMENTS

| | | | | |
|---|---|---|---|---|
| 9,341,708 B2 * | 5/2016 | Nakamura | .............. | G01S 13/89 |
| 10,059,334 B1 * | 8/2018 | Zhu | .................. | G08G 1/096725 |

(Continued)

FOREIGN PATENT DOCUMENTS

| | | | | |
|---|---|---|---|---|
| DE | 102015003115 | 9/2016 | | |
| EP | 2653882 | 10/2013 | | |
| EP | 2653882 A1 * | 10/2013 | ............. | G01S 7/025 |

OTHER PUBLICATIONS

"Extended European Search Report", EP Application No. 21197464.7, Mar. 14, 2022, 10 pages.

(Continued)

*Primary Examiner* — Peter M Bythrow
(74) *Attorney, Agent, or Firm* — Harness, Dickey & Pierce, P.L.C.

(57) ABSTRACT

A radar system for a vehicle includes: at least one main transmit antenna configured to transmit main radar waves essentially parallel to a road on which the vehicle is standing or driving; at least one main receive antenna configured to receive reflections of the main radar waves off objects on the road; a first street condition monitoring, SCM, transmit antenna configured to transmit first polarized radar waves essentially directed to the road at a first polarization; a second SCM transmit antenna configured to transmit second polarized radar waves essentially directed to the road at a second polarization different from the first polarization; a first SCM receive antenna configured to receive, at the first polarization, reflections of the polarized radar waves off the road; and a second SCM receive antenna configured to receive, at the second polarization, reflections of the polarized radar waves off the road.

19 Claims, 3 Drawing Sheets

(58) Field of Classification Search

CPC .......... G01S 7/025; G01S 7/026; G01S 7/032; H01Q 1/3233; H01Q 21/005; H01Q 21/24

See application file for complete search history.

(56) References Cited

U.S. PATENT DOCUMENTS

| | | | | |
|---|---|---|---|---|
| 11,460,536 | B2 * | 10/2022 | Miu ....................... | G01S 13/931 |
| 11,592,522 | B1 * | 2/2023 | Awwad ................... | G01S 7/025 |
| 11,650,306 | B1 * | 5/2023 | DeSalvo ................. | G01S 7/499 |
| | | | | 342/125 |
| 11,840,258 | B2 * | 12/2023 | Shalev-Shwartz ........................... | |
| | | | | B60W 30/181 |
| 11,914,046 | B2 * | 2/2024 | Hamilton .............. | G01S 17/931 |
| 2006/0261975 | A1 * | 11/2006 | Fridthjof ................. | B60T 8/172 |
| | | | | 340/905 |
| 2007/0241962 | A1 * | 10/2007 | Shinoda ................. | H01Q 1/425 |
| | | | | 342/361 |
| 2016/0161609 | A1 * | 6/2016 | Tanaka .................. | G01S 13/582 |
| | | | | 342/81 |
| 2017/0168156 | A1 * | 6/2017 | Hoare ..................... | G01S 7/417 |
| 2017/0293812 | A1 * | 10/2017 | Itoh ........................ | G08B 19/02 |
| 2018/0356511 | A1 * | 12/2018 | Buddendick .......... | G01S 13/584 |
| 2019/0271765 | A1 * | 9/2019 | Ben Khadhra ......... | G01S 7/025 |
| 2020/0025868 | A1 * | 1/2020 | Trummer .............. | G01S 13/931 |
| 2020/0082722 | A1 * | 3/2020 | Beiski ................ | G06K 7/10366 |
| 2020/0096626 | A1 * | 3/2020 | Wang ................... | G01S 13/4454 |
| 2021/0055734 | A1 * | 2/2021 | Yokev .................... | G08G 1/163 |
| 2021/0080568 | A1 * | 3/2021 | Brown ................... | G01S 13/87 |
| 2021/0094577 | A1 * | 4/2021 | Shalev-Shwartz ... | G05D 1/0246 |
| 2021/0165071 | A1 * | 6/2021 | Takeda ................... | G01S 7/412 |
| 2022/0302577 | A1 * | 9/2022 | Kawasaki .............. | H01Q 21/28 |
| 2023/0087328 | A1 * | 3/2023 | Awwad .................. | G01S 7/412 |
| | | | | 342/188 |
| 2024/0222853 | A1 * | 7/2024 | Moss ................... | H01Q 1/2283 |

OTHER PUBLICATIONS

"Extended European Search Report", EP Application No. 22183083.9, Dec. 14, 2022, 12 pages.

"Extended European Search Report", EP Application No. 22183282.7, Dec. 22, 2022, 11 pages.

* cited by examiner

RADAR SYSTEM FOR AUTOMOTIVE APPLICATIONS

INCORPORATION BY REFERENCE

This application claims priority to European Patent Application No. EP22183083.9, filed Jul. 5, 2022, the disclosure of which is incorporated by reference in its entirety.

BACKGROUND

Modern cars often comprise electromagnetic sensors that are for example part of advanced driver-assistance systems (ADAS) such as adaptive cruise control, lane change assistance, intersection assistance to name just a few examples. An example of such an electromagnetic sensor is a radar (radio detection and ranging) sensor which is used for detecting and locating objects such as cars, pedestrians, obstacles, etc. The radar sensor emits an electromagnetic signal, usually as a directed beam, with a specific frequency such as for example 77 GHz. The signal is reflected off an object and the reflected signal (sometimes called an "echo") is received and detected by the radar sensor and further processed to cause corresponding actions.

SUMMARY

Example implementations relate to a radar system for automotive applications that are capable of detecting and locating objects as well as allowing for the monitoring of street conditions.

Described implementations of a radar system are configured to be installed at a vehicle and comprise at least one main transmit antenna being configured to transmit main radar waves essentially parallel to a road on which the vehicle is standing or driving; at least one main receive antenna being configured to receive reflections of the main radar waves off objects on the road; a first street condition monitoring, SCM, transmit antenna being configured to transmit first polarized radar waves essentially directed to the road at a first polarization; a second SCM transmit antenna being configured to transmit second polarized radar waves essentially directed to the road at a second polarization different from the first polarization; and a first SCM receive antenna being configured to receive, at the first polarization, reflections of the polarized radar waves off the road; and a second SCM receive antenna being configured to receive, at the second polarization, reflections of the polarized radar waves off the road.

The main antennas can be used for object detection and location and radiate and receive essentially parallel to the road. Essentially parallel in the context of this application can mean that the longitudinal axis of the main lobe of the antenna's gain pattern is more or less parallel to the street (assuming a flat road), e.g. within ±5°. The SCM antennas are used for street condition monitoring and are essentially directed to the road which means that the longitudinal axes of the main lobes of their gain patterns are tilted and point to the road. The SCM antennas are polarimetric antennas meaning that they are configured to emit and receive at a certain polarization. Examples of such polarization include horizontal and vertical linear polarization as well as left-handed and right-handed circular polarization.

The SCM antennas comprise at least one pair of a transmit and a receive antenna having a first polarization and another pair of transmit and a receive antenna having a second polarization different from the first polarization. This allows for street condition monitoring, e.g. determining street surface and precipitation, by measuring the co-polarized and cross-polarized backscattering coefficients as described in European patent application No.

Thus, example implementations provide an integrated radar system for automotive applications that is at the same time capable of object detection and location as well as street condition monitoring. This meets the requirements of autonomous driving applications which require reliable and detailed information about the vehicular surroundings. Importantly, by providing a single radar system the integration into the vehicle is simplified and costs are significantly reduced as additional radar systems would require additional space, a separate interface to the vehicle's control systems and additional end of line testing at the original equipment manufacturer (OEM).

The at least one main transmit antenna and the first SCM transmit antenna may be the same transmit antenna, and/or the at least one main receive antenna and the first SCM receive antenna may be the same receive antenna. In this way, the number of antennas and the overall form factor of the sensor system may be reduced. The combined (main and SCM) antennas may be configured to select between object detection and location, and street condition monitoring by switching the modulation scheme of the antennas. In one example, the combined antenna may be configured such that the direction of the main lobe of its gain pattern is frequency dependent. Thus, the combined antenna may be steered in a direction essentially parallel to the road or in a direction essentially towards the road depending on the frequency at which the combined antenna is operated.

The main lobes of the beam patterns of the SCM transmit and receive antennas may be tilted relative to the main lobes of the beam patterns of the main transmit and receive antennas. As mentioned, this allows the SCM antennas to perform street condition monitoring by transmitting polarized radar beams onto the street and by measuring its backscattering coefficients at at least two different polarizations. At the same time, the main antennas are able to detect and locate any objects above the road level such as pedestrians, vehicles or road boundaries.

The SCM antennas may be configured to cover an elevation angle of −75° to 0°, such as −40° to −5°, or even −12° to −8° (e.g., −10°) responsive to the radar system being installed at a vehicle. An angle of between −90° and 0° allows the SCM antennas to measure the condition of the road, whereas the main antennas perform object detection and location. An angle of −12° to −8° (e.g., about −10°) advantageously illuminates the road at a range of about three meters (m) to the radar system when mounted at an example height of 0.5 m from the ground. This range is close enough to the vehicle in order to provide information about the immediately surrounding section of the road. On the other hand, it leads to a sufficiently pointed incidence angle relative to the road.

The SCM receive antennas may have a higher dynamic range than the at least one main receive antenna. The high dynamic range allows the detection of multiple kinds of street conditions. As the amplitudes of radar waves backscattered off the street are rather low due to the flat incidence angle as compared to reflections off objects such as cars, the high dynamic range of the SCM antennas allows a reliable classification of the street condition even under such circumstances. Generally, the usage of an antenna having a high dynamic range allows detection of weak signals with a reasonable signal-to-noise ratio.

The SCM antennas may comprise slotted substrate-integrated waveguide (SIW) arrays or slotted air waveguide (AWG) arrays. Slot antennas in substrate-integrated waveguide or air waveguide arrays have higher polarization purity, e.g., a high isolation between co-polarized and cross-polarized radar waves, compared to patch arrays which are more lossy. As the determination of the co-polarized and cross-polarized backscattering coefficients is central to street condition monitoring, a high polarization purity of the SCM transmit and receive antennas is important for a reliable classification of the road condition.

The SCM antennas may comprise a one-way co-polarization to cross-polarization isolation of at least 22.4 dB, such as at least 27.3 dB, or even at least 32.3 dB (e.g., at least 37.3 dB). One-way isolation in this context is understood as the isolation of a single transmit or receive antenna. A high co-polarization to cross-polarization isolation is relevant for reliably classifying the street condition because it relies on an accurate determination of the co-polarized and cross-polarized backscattering coefficients. Hence, the contribution of the antennas to these coefficients due to polarization impurities should be low (e.g., as low as possible).

The gain pattern of the SCM antennas may have a half-power beamwidth of at most 45°, such as at most 35°, or even at most 25° (e.g., at most 14.5°). The half-power beamwidth is also known as the angle at which the antenna gain drops below 3 dB. The beamwidth is designed this way to illuminate only the street in front of the car and not to receive any energy from the sidewalks or other targets other than the street. For example, at a beamwidth of 14.5°, a height of the antenna of 0.5 m above ground and an elevation angle of −10°, the antenna covers an area with a diameter of roughly 77 cm, wherein its midpoint is at a distance of roughly 3 m to the antenna.

The radar system may further comprise a processing device, wherein the main and SCM antennas are communicatively coupled to the processing device. The processing device may comprise a number of transmit output(s) and of receive input(s). The transmit antennas may be communicatively coupled to the transmit outputs and the receive antennas may be communicatively coupled to the receive inputs. The processing device allows to drive the transmit antennas and to receive from the receive antennas. Using certain modulation schemes, it is possible to have the main antennas scan at different azimuth angles in order to detect and locate objects above road levels. Simultaneously or intermittently, the SCM antennas may be operated in order to perform street condition monitoring measurements. Thus, the processing device allows to operate the antennas in order to obtain accurate and useful information about the surroundings of the vehicle.

The SCM antennas may be communicatively coupled to the processing device via frequency-selective elements. Thus, an SCM transmit antenna and a main transmit antenna may be coupled to the same transmit output of the processing device. Likewise, an SCM receive antenna and a main receive antenna may be coupled to the same receive output of the processing device. The processing device may operate either the SCM antenna or the main antenna depending on the modulation scheme, e.g., using different frequencies. The frequency-selective elements can divert the radar signals to the target antenna or from the target antenna depending on the frequency of the radar signals. In this way, it is possible to use, e.g., up to all channels (e.g., inputs and outputs) of the processing device for the main antennas and to use some of the channels additionally for the SCM antennas. Thus, the main and SCM antennas may share some of the channels of the processing device which reduces costs and also allows to integrate the SCM antennas into existing designs. In addition, as no channels need to be sacrificed for the SCM antennas, the performance of the system for object detection and location is maintained.

The main antennas may be configured to operate at a first center frequency, and the SCM antennas may be configured to operate at a second center frequency different from the first center frequency. In this way, the main antennas can be operated by the processing device at the first frequency and due to the frequency-selective elements the SCM antennas are isolated from this operation. The SCM antennas can be activated by or on demand using the second frequency. In this case, the main antennas are isolated from the operation of the SCM antennas due to the frequency-selective elements.

The frequency-selective elements may be or may be implemented with high-pass filters, essentially separating the first frequency from the second frequency. Thus, the two antenna types can be effectively isolated from each other. The cutoff-frequency can advantageously be chosen between the first and second frequency for isolation (e.g., optimal separation).

The frequency-selective elements may be step-impedance filters, frequency-selective power dividers connected to filters, dual-resonance filters, or diplexers. These types of frequency-selective elements allow for a good separation of the main and SCM antennas and can be implemented with reasonable costs and complexity.

The SCM antennas may be communicatively coupled to the frequency-selective elements via waveguides. Waveguides can allow coupling of the antennas to the processing device with low loss. In addition, the frequency-selective elements can be integrated in the waveguides as branches leading to the SCM antennas.

The processing device may comprise at least one monolithic microwave integrated circuit (MMIC). In an example embodiment, the processing device comprises two MMICs. MMICs allow for operating the antennas and performing functions such as mixing, amplification, and modulation. They can be rather small and can be produced at low costs. With the usage of frequency-selective elements as described herein, a main antenna and an SCM antenna may share a single input or output, respectively, of an MMIC. This enables existing designs to be reused and for the SCM antennas to be added at reasonable costs and efforts.

BRIEF DESCRIPTION OF THE DRAWINGS

Example embodiments in accordance with the present invention are described in more detail in the following detailed description with reference to the following figures.

DETAILED DESCRIPTION

In the context of autonomous driving, detailed information about the surroundings of an autonomous vehicle is very important, such as the condition of the street on which the vehicle is travelling. This includes both the surface material of the street such as asphalt, concrete, sand, etc. and possible precipitation such as rain, snow, ice, etc. Special (e.g., dedicated) radar systems can be used for such street condition monitoring (SCM) applications. For example, European patent application No. 21197464.7 of the same applicant discloses a method and a radar system "for determining a road condition," e.g., in the environment of a vehicle. The method can involve a radar system that may be installed at the vehicle and that may have radar "transmitter and receiving units for transmitting and receiving radar waves having two different polarizations."

For the sake of brevity, only a few example implementations are described below. The person skilled in the art will recognize that the features described with reference to these specific implementations may be modified and combined in different ways and that individual features may also be omitted. The general explanations in the sections above also apply to the more detailed explanations below.

Figure 1:
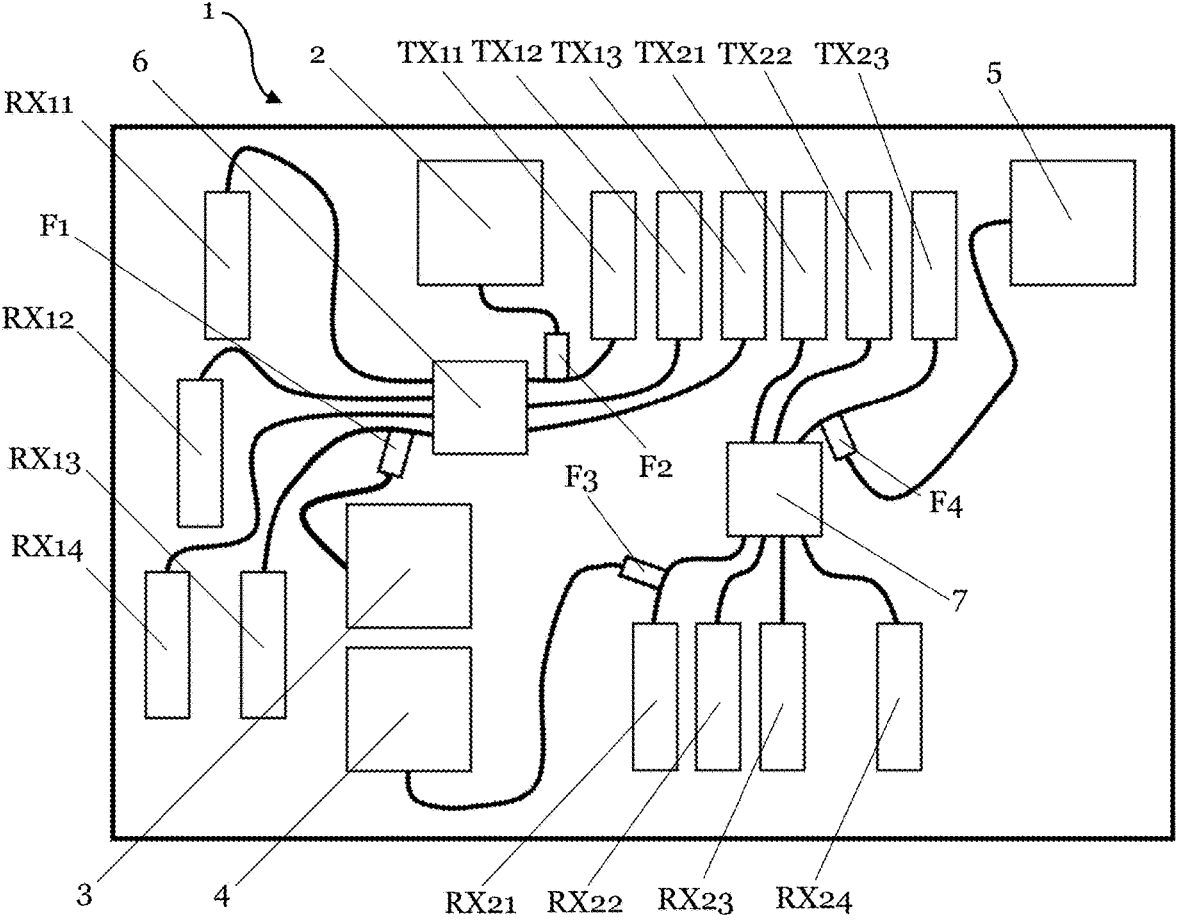
FIG. 1: A radar system according to example implementations with main and SCM antennas.

FIG. 1 illustrates an example embodiment of a radar system according to described implementations. The radar system integrates main transmit antennas TX11, TX12, TX13, TX21, TX22, and TX23; main receive antennas RX11, RX12, RX13, RX14, RX21, RX22, RX23, and RX24; an SCM transmit antenna with horizontal polarization 2; an SCM transmit antenna with vertical polarization 5; an SCM receive antenna with horizontal polarization 4; and an SCM receive antenna with vertical polarization 3. The main antennas are configured for object detection and location and can be realized as patch arrays in the example of FIG. 1. They can also be implemented as slot antennas. Thus, the main transmit antennas TX11, TX12, TX13, TX21, TX22, and TX23 can be configured to transmit main radar waves essentially parallel to a road on which the vehicle, in which the sensor system is to be mounted, is standing or driving. The main receive antennas RX11, RX12, RX13, RX14, RX21, RX22, RX23, and RX24 can be configured to receive reflections of the main radar waves off objects on the road. As such, the main antennas may form a 3×4 MIMO (multiple input multiple output) configuration. It should be noted that the invention is not limited to a particular number of main transmit and receive antennas and that different numbers and configurations may be used. Thus, a different MIMO configuration such as 4×4 may be used.

The radar system may generally be implemented on a printed circuit board (PCB) which acts as a sandwiched structure including a substrate for the components of the radar system. Some components, such as waveguides, may be implemented directly in the substrate.

The SCM antennas 2-5 in the illustrated example embodiment have a horizontal and a vertical linear polarization and, thus, are polarimetric antennas. The invention is not limited to a particular type of polarization, and the polarization is not necessarily orthogonal. For example, left-handed and right-handed polarized antennas may be used as well. The SCM transmit antennas radiate radar waves with a corresponding polarization, and the SCM receive antennas receive radar waves with a corresponding polarization and suppress radar waves having a different polarization. Thus, the horizontally-polarized SCM antennas have a high gain at horizontal polarization but a small gain at vertical polarization. Correspondingly, the vertically-polarized SCM antennas have a high gain at vertical polarization but a small gain at horizontal polarization.

The SCM transmit antennas 2 and 5 are configured to transmit polarized radar waves essentially directed to the road at a corresponding polarization, and the SCM receive antennas 3 and 4 are configured to receive, at a corresponding polarization, reflections (backscattered radar waves) of the polarized radar waves off the road. Although the waves incident on the road have essentially just a single polarization, the road and/or any covering (e.g., rain, ice, snow) may cause the reflected waves to contain a mixture of both polarizations. This effect can be exploited, and the corresponding classification process will be described briefly below.

The SCM antennas in the example embodiment of FIG. 1 may have a bandwidth of 1.5 GHz. The bandwidth may be different in other embodiments.

The radar sensor in the example embodiment of FIG. 1 also comprises two monolithic microwave integrated circuits MMICs 6 and 7. An MMIC allows a device to operate the antennas and performs functions such as mixing, amplification, and modulation. Each MMIC may operate both the main and the SCM antennas using certain modulation schemes. As will be shown below, a modulation scheme may be used to activate the SCM antennas on demand. The invention is not limited to using two MMICs. It is also possible to use just a single MMIC or more than two.

As shown in FIG. 1 by way of example, the main and SCM antennas are operatively coupled to the MMICs by waveguides. The waveguides may be implemented as substrate integrated waveguides (SIW) on a PCB.

In the example embodiment of FIG. 1, the SCM antennas can be used exclusively for street condition monitoring, and the main antennas can be exclusively used for object detection and location. However, in other embodiments a single antenna may perform both functions. For example, a radar antenna may be designed with a squint, meaning that its radiation angle is frequency dependent. This can be achieved, for instance, by using a center-fed antenna and by exploiting a certain phase shift between radiator elements. In case of serially fed antennas, two antennas being stacked vertically can be used. In this way, the direction of the main lobe of the gain pattern of the antenna can be frequency-dependent such that the elevation angle can be controlled by the frequency at which the antenna is operated. In this way, the mode of the antenna (object detection and location above road level or street condition monitoring) can be chosen by a corresponding modulation scheme applied, for example, by an MMIC.

In the example embodiment of FIG. 1, the SCM antennas can be isolated from the main antennas by frequency-selective elements F1, F2, F3, and F4, which are described in more detail below. To support such frequency separation, the main and SCM antennas can operate at different center frequencies. In the example of FIG. 1, the main antennas may operate at a center frequency of 76.5 GHz while the SCM antennas may operate at a center frequency of 80.5 GHz. Other center frequencies may be used as well.

Returning to the frequency elements F1, F2, F3, and F4, these may be realized for example as dual-resonance filters or diplexers. For example, a filter may be used that operates essentially as a high-pass filter and offers a low resistance path to the higher frequency of the SCM antennas (80.5 GHz in an example embodiment). The filter bandwidth may be optimized to feed the SCM antennas and provide an operational bandwidth of 1.5 GHz (e.g., 79.5-81 GHz in an example embodiment). In the example embodiment of FIG. 1, two branch-outs can "squeeze out" 6 dB of power at 80.5 GHz from the main feeding arm and are combined into a single waveguide to feed the SCM antennas. To reduce losses and efficiently feed the SCM antennas, the higher frequency can be branched out from the main feeding arm as close as is feasible to the input of the transition. Additionally, two further branch-outs can be used with terminations to squeeze out another 6 dB of power at 80.5 GHz from the main feeding arm in order to have better isolation between the main and SCM antennas.

As described above, the different center frequencies of the main and SCM antennas and the coupling of the SCM antennas to the feeding arms of the main antennas via frequency-selective elements F1, F2, F3, and F4 allows a device to gain the polarimetric capabilities for street condition monitoring of the sensor at 80.5 GHz in addition to the regular operation of the radar sensor at 76.5 GHz. The street monitoring mode can be activated on demand, for instance, by a modulation scheme provided by the MMICs.

Figure 2:
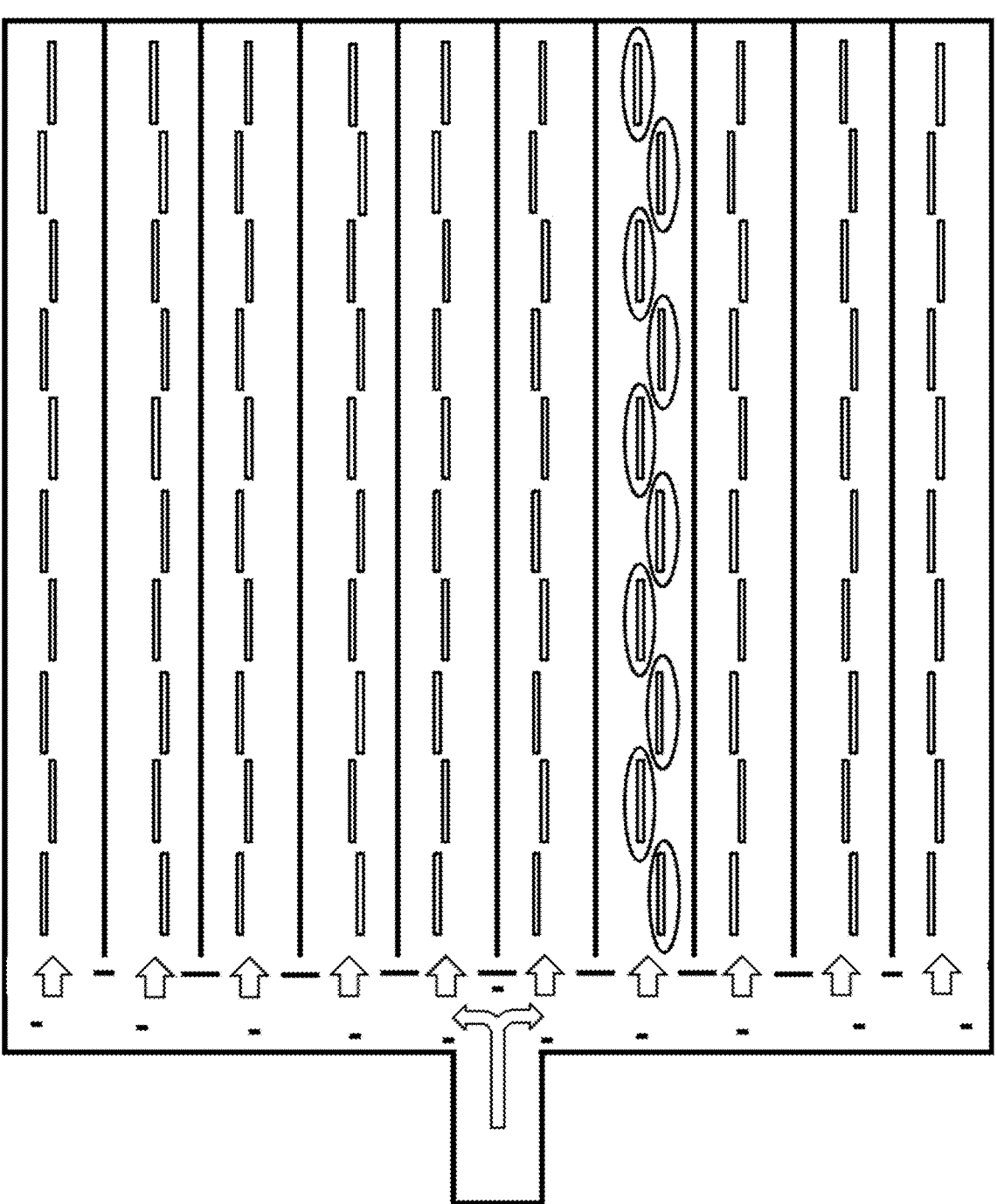
FIG. 2: An example configuration of an SCM antenna having horizontal polarization.
Figure 3:
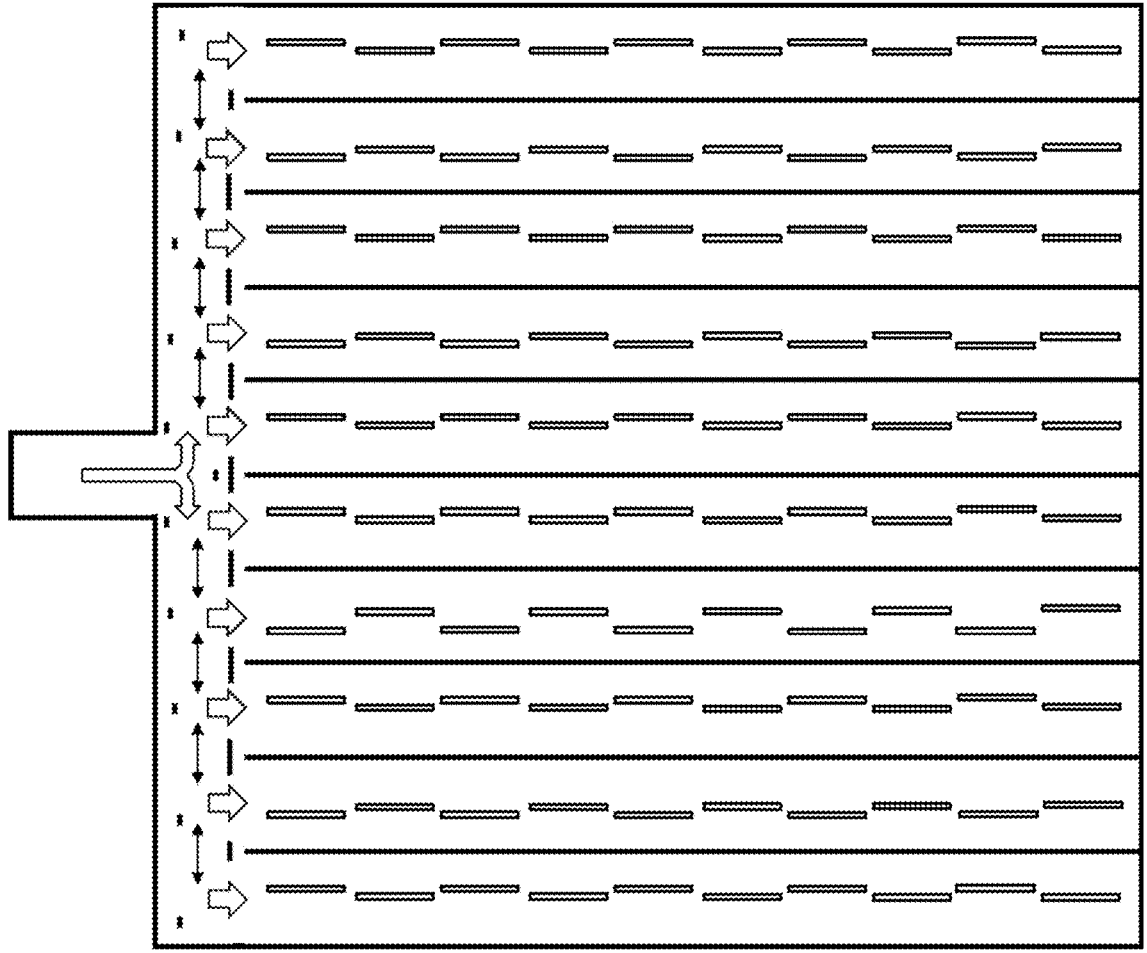
FIG. 3: An example configuration of an SCM antenna having vertical polarization.

Example designs of the SCM antennas that can be used with described implementations, such as the SCM antennas 2-5, are described in more detail with respect to FIGS. 2 and 3. These figures show SCM antennas designed as slot antennas in substrate Integrated waveguides (SIW) or air waveguides (AWG). Such types of antennas can have higher polarization purity (high co/cross polarity isolation) compared to patch arrays, which may be more lossy. Thus, the antenna designs shown in FIGS. 2 and 3 allow for a 1-way co-pol/cross-pol isolation of 37 dB. FIG. 2 shows an example SCM antenna for horizontal polarization while FIG. 3 shows an example SCM antenna for vertical polarization. In the depicted examples, the antennas are realized as an array of 10×10 slots having a maximum gain of 24.7 dB at an elevation angle of −10° (e.g., tilted down at the road when mounted in a vehicle). Other example configurations include an 8×8 antenna array having a maximum gain of 22.8 dB at an elevation angle of −10°, a 6×6 antenna array having a maximum gain of 20.3 dB at an elevation angle of −10°, and a 4×4 antenna array having a maximum gain of 16.7 dB at an elevation angle of −10°. However, other antenna array sizes, elevation angles, maximum gains, and combinations thereof may be implemented.

The slotted array for horizontal polarization shown in FIG. 2 is fed from the bottom, wherein each slot is placed such that it provides a targeted phase shift for the radiating beam to be tilted downwards in elevation. On the other hand, the slotted array for vertical polarization is fed from the side as shown in FIG. 3. In this case, the meander path lines are designed for the phase difference targeted to make the arrays (bottom to top) radiate with a beam tilted downwards in elevation.

It is generally observed that the higher the gain the narrower may be the beamwidth of the SCM antennas. In some cases, the main lobe of the SCM antennas can be tilted such that it covers the range up to 10 m in front of the vehicle, into which the sensor system is mounted, with high signal-to-noise ratio (SNR). The elevation angle θ can be calculated using the following formula, assuming that h is the mounting height of the sensor and r is the desired range of the SCM antennas: $\theta = \tan^{-1}(h/r)$. In an example, the radar sensor is mounted at a height of 0.5 m and has a range of 2.99 m at an elevation angle of −9.49°.

The 3 dB or half-power beamwidth (HPBW) area coverage in azimuth with different elevation angles of an antenna with a diameter of 18 mm at 80.5 GHz can be calculated using the following equation:

$$HPBW = 70\left(\frac{\lambda}{D}\right),$$

wherein λ is the wavelength, D is the longest dimension of the antenna, and 70 is an antenna-dependent factor varying for different antenna types. Using basic trigonometry, it is observed that, for example at a range of 3 m and a beam tilted in elevation around −10°, the 3 dB beamwidth in azimuth is 0.77 m corresponding to an HPBW of 14.5°. Advantageously, in some cases, the beamwidth can be designed to illuminate only, or primarily, the street in front of the car and not to receive any, or much, energy from the sidewalks or other targets than the street.

Next, an example basic method of using the SCM antennas to classify different road conditions (street condition monitoring) is briefly explained. More details can be found in European patent application No. 21197464.7 of the same applicant which is incorporated by reference in its entirety herein.

As described above, the SCM antennas illuminate an area of the street in front of the car by polarized radar waves and receive reflections, e.g. backscattered radar waves at different polarizations. Horizontal and vertical polarization is generally described herein, but other polarizations such as left-handed circular and right-handed circular may be used as well. The returns, e.g. the backscattering coefficients received by the SCM antennas, are denoted as HH (radar wave sent at horizontal polarization, reflection received at horizontal polarization), VV (radar wave sent at vertical polarization, reflection received at vertical polarization), HV (radar wave sent at horizontal polarization, reflection received at vertical polarization) and VH (radar wave sent at vertical polarization, reflection received at horizontal polarization).

Generally, the HV return is affected the most by the roughness of the road, material of the road, and the weather conditions, while the VV return is the least affected. The difference between VV and HV is typically vast and is able to separate different road surfaces efficiently. The differential back-scattering coefficient (HH/VV) is unable to distinguish between road surfaces, but it follows a specific pattern: when plotting HH/VV to VV-HV, each road surface has a return in a different region and could be clustered separately. A single data point (single measurement point at one incidence angle) inside this cluster is sufficient to classify the road types with less computational power.

When the HV returns from the street are not available, a similar method could be used by taking the difference in VV and HH street returns for this particular case. Using this method, it is worth noting that wet surfaces tend to have widely spread data points (high variance) while dry surfaces tend to have data points that cluster in a small region (low variance).

Thus, when the HV returns are available from the street, a single data point is sufficient to recognize and differentiate different road conditions which also leads to less processing and computation power. If the HV returns from the street are not available, the differential reflectivity with difference in co-pol for each incidence angle can be considered to find the surface condition using their variance. Finally, using their VV returns, the type of street can be identified.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

What is claimed is:

1. A radar system comprising:
at least one main transmit antenna configured to transmit main radar waves essentially parallel to a road on which a vehicle is standing or driving;
at least one main receive antenna configured to receive reflections of the main radar waves off objects on the road;
a first street condition monitoring (SCM) transmit antenna configured to transmit first polarized radar waves essentially directed to the road at a first polarization;
a second SCM transmit antenna configured to transmit second polarized radar waves essentially directed to the road at a second polarization different from the first polarization;
a first SCM receive antenna configured to receive, at the first polarization, reflections of the first polarized radar waves off the road; and
a second SCM receive antenna configured to receive, at the second polarization, reflections of the second polarized radar waves off the road,
wherein the first and second SCM transmit and receive antennas are communicatively coupled to a processing device via frequency-selective elements, and
wherein the frequency-selective elements include at least one of (a) high-pass filters, (b) step-impedance filters, (c) frequency-selective power dividers connected to filters, (d) dual-resonance filters, and (e) diplexers.

2. The radar system of claim 1, wherein the at least one main transmit antenna and the first SCM transmit antenna comprise a same transmit antenna.

3. The radar system of claim 1, wherein the at least one main receive antenna and the first SCM receive antenna comprise a same receive antenna.

4. The radar system of claim 1, wherein:
the at least one main transmit antenna and the first SCM transmit antenna comprise a same transmit antenna; and
the at least one main receive antenna and the first SCM receive antenna comprise a same receive antenna.

5. The radar system of claim 1, wherein main lobes of beam patterns of the first and second SCM transmit and receive antennas are tilted relative to main lobes of beam patterns of the main transmit and receive antennas.

6. The radar system of claim 1, wherein the first and second SCM transmit and receive antennas are configured to cover an elevation angle of −75° to 0° responsive to the radar system being installed at the vehicle.

7. The radar system of claim 1, wherein the first and second SCM receive antennas have a higher dynamic range than the at least one main receive antenna.

8. The radar system of claim 1, wherein the first and second SCM transmit and receive antennas comprise at least one of slotted substrate-integrated waveguide (SIW) arrays or slotted air waveguide (AWG) arrays.

9. The radar system of claim 1, wherein the first and second SCM transmit and receive antennas comprise a one-way co-polarization to cross-polarization isolation of at least 22.4 dB.

10. The radar system of claim 1, wherein a gain pattern of the first and second SCM transmit and receive antennas has a half-power beamwidth of at most 45°.

11. The radar system of claim 1, further comprising:
the processing device,
wherein the main transmit and receive antennas and the first and second SCM transmit and receive antennas are communicatively coupled to the processing device.

12. The radar system of claim 11, wherein:
the main transmit and receive antennas are configured to operate at a first center frequency; and
the first and second SCM transmit and receive antennas are configured to operate at a second center frequency different from the first center frequency.

13. The radar system of claim 12, wherein the frequency-selective elements comprise high-pass filters configured to separate the first center frequency from the second center frequency.

14. The radar system of claim 11, wherein the frequency-selective elements comprise at least one of step-impedance filters, frequency-selective power dividers connected to filters, dual-resonance filters, or diplexers.

15. The radar system of claim 11, wherein the first and second SCM transmit and receive antennas are communicatively coupled to the frequency-selective elements via waveguides.

16. The radar system of claim 11, wherein the processing device comprises at least one monolithic microwave integrated circuit (MMIC).

17. The radar system of claim 1, wherein:
the main transmit and receive antennas are configured to operate at a first center frequency; and
the first and second SCM transmit and receive antennas are configured to operate at a second center frequency different from the first center frequency.

18. A vehicle comprising a radar system, the radar system comprising:
at least one main transmit antenna configured to transmit main radar waves essentially parallel to a road on which the vehicle is standing or driving;
at least one main receive antenna configured to receive reflections of the main radar waves off objects on the road;
a first street condition monitoring (SCM) transmit antenna configured to transmit first polarized radar waves essentially directed to the road at a first polarization;
a second SCM transmit antenna configured to transmit second polarized radar waves essentially directed to the road at a second polarization different from the first polarization;
a first SCM receive antenna configured to receive, at the first polarization, reflections of the first polarized radar waves off the road; and
a second SCM receive antenna configured to receive, at the second polarization, reflections of the second polarized radar waves off the road,
wherein the first and second SCM transmit and receive antennas are communicatively coupled to a processing device via frequency-selective elements,
wherein the frequency-selective elements include at least one of (a) high-pass filters, (b) step-impedance filters, (c) frequency-selective power dividers connected to filters, (d) dual-resonance filters, and (e) diplexers.

19. A method comprising:
transmitting, from at least one main transmit antenna, main radar waves essentially parallel to a road on which a vehicle is standing or driving;

receiving, by at least one main receive antenna, reflections of the main radar waves off objects on the road;

transmitting, from a first street condition monitoring (SCM) transmit antenna, first polarized radar waves essentially directed to the road at a first polarization; 5 transmitting, from a second SCM transmit antenna, second polarized radar waves essentially directed to the road at a second polarization different from the first polarization;

receiving, by a first SCM receive antenna at the first 10 polarization, reflections of the first polarized radar waves off the road; and receiving, by a second SCM receive antenna at the second polarization, reflections of the second polarized radar waves off the road, 15 wherein the first and second SCM transmit and receive antennas are communicatively coupled to a processing device via frequency-selective elements, wherein the frequency-selective elements include at least one of (a) high-pass filters, (b) step-impedance filters, 20 (c) frequency-selective power dividers connected to filters, (d) dual-resonance filters, and (e) diplexers.

* * * * *